United States Patent

He

(10) Patent No.: US 8,493,241 B2
(45) Date of Patent: Jul. 23, 2013

(54) SYSTEMS, METHODS AND COMPUTER READABLE MEDIA FOR DISPLAYING MULTIPLE OVERLAID IMAGES TO A PILOT OF AN AIRCRAFT DURING FLIGHT

(75) Inventor: Gang He, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 456 days.

(21) Appl. No.: 12/956,927

(22) Filed: Nov. 30, 2010

(65) Prior Publication Data

US 2012/0133529 A1    May 31, 2012

(51) Int. Cl.
*G01C 21/00*    (2006.01)

(52) U.S. Cl.
USPC ............... 340/977; 340/945; 340/973; 342/29

(58) Field of Classification Search
USPC ............ 340/977, 961, 945, 972, 973, 903, 340/902; 342/29, 455
See application file for complete search history.

(56) References Cited

U.S. PATENT DOCUMENTS

| | | | |
|---|---|---|---|
| 5,317,394 A | 5/1994 | Hale et al. | |
| 5,684,496 A | 11/1997 | Parus | |
| 6,166,744 A * | 12/2000 | Jaszlics et al. | 345/629 |
| 6,885,334 B1 * | 4/2005 | Hager et al. | 342/62 |
| 7,148,861 B2 | 12/2006 | Yelton et al. | |
| 7,298,869 B1 | 11/2007 | Abernathy | |
| 7,312,725 B2 * | 12/2007 | Berson et al. | 340/980 |
| 7,352,292 B2 | 4/2008 | Alter et al. | |
| 7,365,652 B2 | 4/2008 | Scherbarth | |
| 7,605,719 B1 * | 10/2009 | Wenger et al. | 340/974 |
| 7,655,908 B2 | 2/2010 | Kerr | |
| 7,961,117 B1 * | 6/2011 | Zimmerman et al. | 340/980 |
| 8,099,234 B1 * | 1/2012 | Frank et al. | 701/436 |
| 8,193,948 B1 * | 6/2012 | Shapiro et al. | 340/965 |
| 8,400,330 B2 * | 3/2013 | He et al. | 340/960 |
| 2004/0169617 A1 | 9/2004 | Yelton et al. | |
| 2005/0232512 A1 | 10/2005 | Luk et al. | |
| 2006/0266942 A1 | 11/2006 | Ikeda | |
| 2007/0297696 A1 | 12/2007 | Hamza et al. | |
| 2008/0180351 A1 | 7/2008 | He | |
| 2010/0231418 A1 | 9/2010 | Whitlow et al. | |
| 2010/0250030 A1 | 9/2010 | Nichols et al. | |
| 2010/0268458 A1 * | 10/2010 | Becker et al. | 701/208 |

* cited by examiner

*Primary Examiner* — Eric M Blount
(74) *Attorney, Agent, or Firm* — Ingrassia Fisher & Lorenz, P.C.

(57) ABSTRACT

Embodiments for displaying first and second images to a pilot of an aircraft are presented. The embodiments include, but are not limited to, obtaining a first image signal and a second image signal, commanding a display unit to display a first image on a display screen corresponding to the first signal, and computing an image moving velocity of the first image. The method further comprises estimating an image flow velocity for the second image based on the second image signal and comparing the image moving velocity of the first image to the image flow velocity of the second image. After the comparison, the display unit is commanded to display the second image overlaid on the first image, and commanding the display unit to establish an intensity of the second image within a predefined range based upon the comparison.

17 Claims, 5 Drawing Sheets

SYSTEMS, METHODS AND COMPUTER READABLE MEDIA FOR DISPLAYING MULTIPLE OVERLAID IMAGES TO A PILOT OF AN AIRCRAFT DURING FLIGHT

TECHNICAL FIELD

The technical field generally relates to aviation and more particularly relates to a method for automatically determining, fading in an overlaying an enhanced vision system image for a pilot of an aircraft during flight.

BACKGROUND

Aircraft are commonly equipped with one or more vision enhancing systems. Such vision enhancing systems are designed and configured to assist a pilot when flying in conditions that diminish the pilot's view from the cockpit, such as, but not limited to, darkness and weather phenomenon. One example of a vision enhancing system is known as a synthetic vision system (hereinafter, "SVS") and may be more generally described as a being a dynamic condition subsystem of the aircraft. An example of a synthetic vision system is disclosed in U.S. Pat. No. 7,352,292 which is hereby incorporated herein by reference in its entirety. Additionally, an exemplary synthetic vision system is available for sale in the market place under product name SmartView, manufactured by Honeywell International, Inc.

A typical SVS is configured to work in conjunction with a position determining unit associated with the aircraft as well as with dynamic sensors that sense the aircraft's altitude, heading, and attitude. The SVS typically includes a database containing information relating to the topography along the aircraft's flight path. The SVS receives inputs from the position determining unit indicative of the aircraft's location and also receives inputs from the dynamic sensors on board the aircraft indicative of the aircraft's heading, altitude, and attitude. The SVS is configured to utilize the position, heading, altitude, and orientation information and the topographical information contained in its database, and generate a three-dimensional image that shows the topographical environment through which the aircraft is flying from the perspective of a person sitting in the cockpit of the aircraft. The three-dimensional image may be displayed to the pilot on any suitable display unit accessible to the pilot. Using an SVS, the pilot can look at the display screen to gain an understanding of the three-dimensional topographical environment through which the aircraft is flying and can also see what lies ahead. One advantage of the SVS is that its image is clean and is not obstructed by any weather phenomenon. One drawback of the SVS is its dependence upon the information contained in its database. If the database is not up to date, then the image presented to the pilot may not be an accurate depiction of the topographical environment around the aircraft.

Another example of a vision enhancing system is known as an enhanced vision system (hereinafter, "EVS") and may be more generally described as being a sensor subsystem. Examples of enhanced vision systems are disclosed in U.S. Pat. Nos. 7,655,908 and 5,317,394 which are hereby incorporated herein by reference in their entirety. Additionally, an exemplary enhanced vision system is available for sale in the market place under product name EVS-II, manufactured by Kollsman, Inc. A typical EVS includes an imaging device, such as, but not limited to, a visible lowlight television camera, an infrared camera, or any other suitable light detection system capable of detecting light or electromagnetic radiation, either within or outside of the visible light spectrum. Such imaging devices are mounted to the aircraft and oriented to detect light transmissions originating from an area outside of the aircraft and are typically located ahead of the aircraft in the aircraft's flight path. The light received by the EVS is used by the EVS to form an image that is then displayed to the pilot on any suitable display in the cockpit of the aircraft. The sensor used in an EVS is more sensitive to light than is the human eye. Accordingly, using the EVS, a pilot can view elements of the topography that are not visible to the human eye. For this reason, an EVS is very helpful to a pilot when attempting to land an aircraft in inclement weather or at night. One advantage to an EVS system is that it depicts what is actually present versus depicting what is recorded in a database.

Some aircraft are equipped with both an EVS and an SVS. In such aircraft, the images from the EVS and the SVS are commonly shown to the pilot on the same display screen, with the image from the EVS being overlaid on top of the image from the SVS such that the portion of the SVS image located below the EVS image may not be visible.

In addition to the above described vision systems, additional images, in the form of symbology, are typically presented to the pilot on the same display screen where the images from the EVS and the SVS are displayed. The symbology commonly appears as an icon or a series of icons on the display screen and may be indicative of the aircraft's heading, direction, attitude, and orientation. Such symbology serves an important role in providing the pilot with situational awareness and controls concerning the orientation and attitude of the aircraft. This symbology is traditionally overlaid over the image presented by the SVS and the EVS.

The information provided by the EVS plays an important role in enabling the pilot to maintain situational awareness during the flight, and in particular, approach and landing during low visibility conditions. During certain portions of the flight, such as determining whether to proceed with a landing or to initiate a go-around procedure, the information provided by the EVS may have greater importance to the pilot than the information provided by the SVS.

At some point during approach (e.g., during a transition phase between a time prior to the point where an aircraft EVS system can perceive the runway until the pilot has a visual on the runway), the pilot may intuitively evaluate which of the EVS or the SVS is the more reliable or useable based on the current visibility conditions. When the EVS is determined to be reliable, the SVS system may be turned off. Although a display may include both an EVS image and an SVS image as a fused image (such as overlaying a semi-transparent EVS image onto an SVS image), or a side by side display, during this transition phase pilot heads up time and attention may be unnecessarily demanded.

Accordingly, it is desirable to provide systems and methods to automatically determine at what point in the approach phase the EVS can be objectively relied upon. In addition, it is desirable to reduce the work load on the pilot. Furthermore, other desirable features and characteristics of the present invention will become apparent from the subsequent detailed description of the invention and the appended claims, taken in conjunction with the accompanying drawings and this background of the invention.

BRIEF SUMMARY

Systems, methods and computer readable media for displaying multiple overlaid images to a pilot of an aircraft during flight are disclosed herein.

In an embodiment, the system includes, but is not limited to, a dynamic condition subsystem that is configured to detect a dynamic condition of the aircraft and to generate a first signal indicative of the dynamic condition of the aircraft and a sensor subsystem configured to detect a light transmission originating from an exterior of the aircraft and to generate a second signal indicative of the light transmission. The system further comprises a display unit having a display screen and a processor communicatively coupled to the sensor subsystem and to the dynamic condition subsystem and operatively coupled to the display unit. The processor is configured to obtain the first signal and the second signal, command the display unit to display the first image on the display screen corresponding to the first signal and compute an image moving velocity of the first image. The processor is also configured to estimate an image flow velocity for the second image based on the second signal and compare the moving velocity of the first image to the image flow velocity of the second image. After the comparison, the processor is configured to command the display unit to display the second image overlaid on the first image, and command the display unit to establish the intensity of the second image within a predefined range based upon the comparison.

In an embodiment, the method for displaying a first image a second image to a pilot of an aircraft during flight includes, but is not limited to, obtaining a first image signal and a second image signal, commanding a display unit to display a first image on a display screen corresponding to the first signal, and computing an image moving velocity of the first image. The method further comprises estimating an image flow velocity for the second image based on the second image signal and comparing the image moving velocity of the first image to the image flow velocity of the second image. After the comparison the method comprises commanding the display unit to display the second image overlaid on the first image, and commanding the display unit to establish an intensity of the second image within a predefined range based upon the comparison.

The computer readable storage medium contains instructions that include, but are not limited to, obtain a first image signal and a second image signal, command a display unit to display a first image on a display screen corresponding to the first signal and compute an image moving velocity of the first image. The acts further comprise estimate an image flow velocity for the second image based on the second image signal and compare the image moving velocity of the first image to the image flow velocity of the second image. After the comparison, the acts include command the display unit to display the second image overlaid on the first image; and command the display unit to establish intensity for the second image.

BRIEF DESCRIPTION OF THE DRAWINGS

The present invention will hereinafter be described in conjunction with the following drawing figures, wherein like numerals denote like elements.

DETAILED DESCRIPTION

Figure 1:
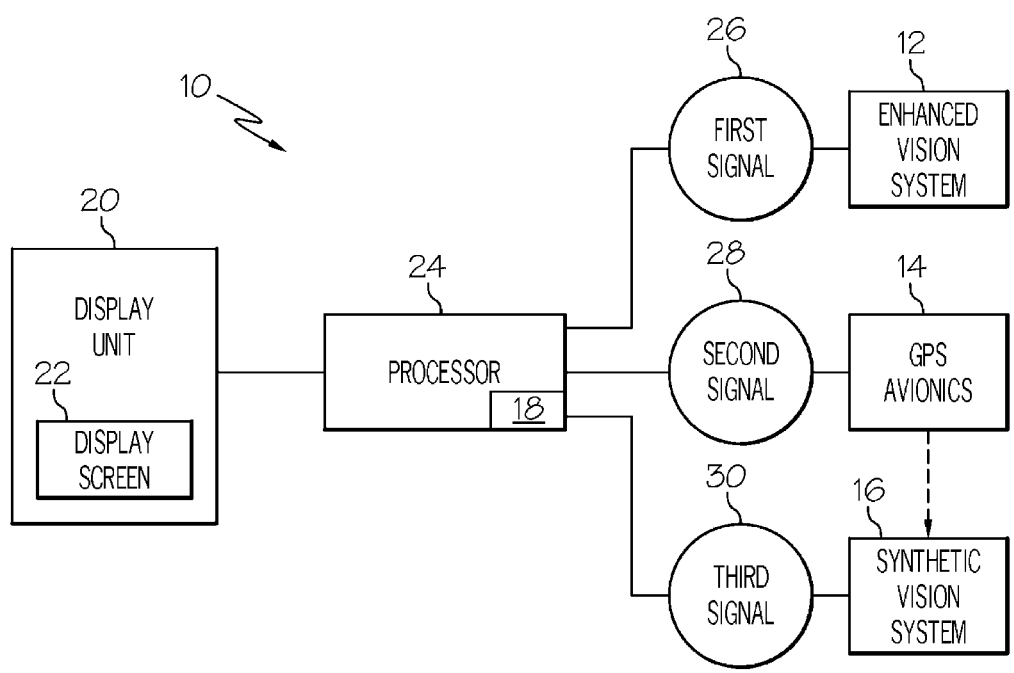
FIG. 1 is a schematic view illustrating a system for displaying an overlaid EVS image to a pilot of an aircraft during flight.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments. Any of the above devices are exemplary, non-limiting examples of a computer readable storage medium.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Any of the above devices are exemplary, non-limiting examples of a computer readable storage medium In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

The following detailed description is merely exemplary in nature and is not intended to limit application and uses. Furthermore, there is no intention to be bound by any theory presented in the preceding background or the following detailed description.

Improved systems and methods for displaying overlaid images to a pilot of an aircraft during flight and determining the reliability thereof are disclosed. Using the system disclosed herein, images generated by an EVS and/or an SVS can be presented to a pilot together in a manner that permits the pilot to discern the image generated by the EVS or the SVS without compromising the reliability of the presentation thereof. The system is configured to automatically fade in an overlaid EVS display as the reliability of the EVS display approaches and surpasses a particular quality level. In other embodiments, the SVS display may fade out while the EVS display fades in.

FIG. 1 is a simplified functional block diagram illustrating a system 10 for displaying multiple overlaid images to a pilot of an aircraft during flight. System 10 includes multiple components each of which may be configured for mounting to aircraft. In some embodiments, system 10 may be a self-contained system such that each of the components described below are contained in a single housing and are dedicated exclusively to serving the functions of system 10, while in other embodiments, the various components described below may be standalone components or they may be components that are used as part of other systems and which are configured to be used as a shared resource between such other systems and system 10.

In the embodiment illustrated in FIG. 1, system 10 includes an enhanced vision system 12 (EVS), a Global Positioning System and avionics sensors 14, an image weighting decisioner 18, a synthetic vision system 16 (SVS), a display unit 20, a display screen 22, and a processor 24. In equivalent embodiments, system 10 may include either additional or fewer components.

EVS 12 includes one or more sensors adapted for mounting to an aircraft and configured to detect a light signature originating from outside the aircraft. The sensor may include a visible low light television camera, an infrared camera, and millimeter wave (MMW) camera or any other light sensing device capable of detecting light either within, or outside of the visible spectrum. The light signature may include any light that is projected from, or that is reflected off of any terrain or object outside of the aircraft. In one application, the light signature includes, but is not limited to, signature components from lights that are positioned adjacent to a runway and which are pointed to facilitate approach runway position and bearing identification.

EVS 12 is configured to generate a first signal 26 and to provide first signal 26 to processor 24. First signal 26 is an electronic signal that includes information corresponding to the light signature detected by EVS 12 and which would enable processor 24 to render an image of the light signature (referred to hereinafter as "the EVS image"). For example, if the detected light signature includes components of a distant runway and runway approach lights adjacent to the runway, first signal 26 would enable processor 24 to render an image of the distant runway and the adjacent runway approach lights. In some embodiments, EVS 12 may include a dedicated processor, a microprocessor, circuitry, or some other processing component that is configured to receive input from the one or more light detecting sensors and to generate first signal 26 using such inputs. In other embodiments, EVS 12 may not include a dedicated processor, microprocessor, circuitry or other processing component, in which case the first signal 26 would comprise unprocessed inputs from the light detecting sensors of EVS 12 for processing by processor(s) 24.

SVS 16 is configured to generate a three-dimensional image of the topographical environment around the aircraft (referred to hereinafter as "the SVS image") generate a third signal 30 carrying SVS Image and to provide the third signal 30 to processor 24. In some embodiments, SVS 16 may include a data storage device (not shown) containing a data base with data relating to the topography, which may represent either or both landscape and/or man-made structures located along the aircraft's flight path. In some embodiments, the data storage device may contain such data for an entire geographical region such as a state, a country or continent. SVS 16 may also access or include a position determining unit that is configured to determine the position of the aircraft with respect to the surface of the earth. Such a position determining unit may include, but is not limited to, a GPS system, an inertial navigation system, and the like. SVS 16 may be configured to receive course, speed and other avionics inputs relating to the aircraft's heading, altitude and attitude. In equivalent embodiments, SVS 16 may receive the GPS and avionics inputs from the aircraft's GPS and avionics sensors 14.

In some embodiments, SVS 16 may include a dedicated processor, microprocessor, or other circuitry that is configured to take the information pertaining to the position, attitude, altitude and heading of the aircraft and to utilize the information available in the database to generate a third signal 30 that may be utilized by processor 24 to render a three-dimensional image of the topographical environment through which the aircraft is flying. In other embodiments, SVS 16 may not include a dedicated processor, microprocessor or other circuitry. In such embodiments, third signal 30 would contain the unprocessed sensor information and location data which could then be utilized by processor 24 to render the three dimensional image of the topographical environment. In either event, SVS 16 is configured to provide third signal 30 to processor 24.

Display unit 20 may be any type of display device that generates visual output using any one of a number of different technologies. For example, display unit 20 may be a Cathode Ray Tube (CRT) display device, a flat panel display device, a Liquid Crystal Display (LCD) device, a plasma display device, an electro-luminescent display device, a Light Emitting Diode (LED) display device, a holographic display device, a Head Up Display (HUD), a Micro Mirror Device (MMD) display device, a near-to-eye display or the like.

Additionally, display unit 20 includes a display screen 22 that is operatively connected to display unit 20. Display screen 22 is configured to be controlled by display unit 20 and may be used to display any type of image including, but not limited to, graphics and text. In some embodiments, display unit 20 may include multiple display screens 22 and system 10 may include multiple display units 20.

Processor 24 may be any type of computer, computer system, microprocessor, collection of logic devices, or any other analog or digital circuitry that is configured to calculate, and/or to perform algorithms, and/or to execute software applications, and/or to execute sub-routines, and/or to be loaded with and to execute any type of computer program. Processor 24 may comprise a single processor or a plurality of processors acting in concert. In some embodiments, processor 24 may be dedicated for use exclusively with system 10 while in other embodiments processor 24 may be shared with other systems on board the aircraft. In still other embodiments, processor 24 may be integrated into any of the other components of system 10. For example, in some embodiments, processor 24 may be a component of SVS 16 or of EVS 12.

Processor 24 is communicatively coupled to EVS 12, GPS/avionics sensors 14, and SVS 16, and is operatively coupled to display unit 20. Such communicative and operative connections may be effected through the use of any suitable means of transmission, including both wired and wireless connections. For example, each component may be physically connected to processor 24 via a coaxial cable or via any other type of wired connection effective to convey electronic signals. In other embodiments, each component may be communicatively connected to processor 24 across a bus or other similar communication corridor. Examples of suitable wireless connections include, but are not limited to, a Bluetooth connection, a Wi-Fi connection, an infrared connection or the like.

Being communicatively and/or operatively coupled with EVS 12, GPS/avionics sensors 14, SVS 16, and display unit 20, provides processor 24 with a pathway for the receipt and transmission of signals, commands, instructions, and interrogations to and from each of the other components. Processor 24 is configured (i.e., loaded with and being capable of executing suitable computer code, software and/or applications) to interact with and to coordinate with each of the other components of system 10 for the purpose of overlaying images corresponding to first signal 26 and third signal 30. For example, in the illustrated embodiment, processor 24 is configured to receive third signal 30 from SVS 16 and to send a command to display unit 20 instructing display unit 20 to display a corresponding SVS image on a display screen 22. Processor 24 may also be configured to receive a second signal 28 from the aircraft's GPs/Avionics system 14.

Processor 24 is also configured to receive first signal 26 from EVS 12 and to send a command to display unit 20 instructing display unit 20 to display the EVS image on display screen 22. Processor 24 is further configured to command display unit 20 to overlay the semi-transparent EVS image on top of the SVS image. Furthermore, because the EVS image actually presents what is along the aircraft's flight path, processor 24 may give precedence to the EVS image and may from time to time command display unit 20 to obscure or gradually fade out portions of the SVS image lying beneath the EVS image. In other embodiments, the processor 24 may gradually fade in the EVS image to overlay the SVS image based on a weighting scheme.

Processor 24 is in operable communication with the image weighting decisioner 18. Image weighting decisioner 18 may be a suitably configured and programmed computing device or in equivalent embodiments may be a software module executing on the processor 24. In other embodiments, the image weighting decisioner 18 may comprise firmware or may be manifested as a combination of hardware, firmware and software. In still other embodiments, the image weighting decisioner 18 and the processor 24 may work together in tandem.

In some embodiments, the image weighting decisioner 18 is suitably configured to estimate the optical or image flow velocity from the various real world features displayed in the EVS image. Image flow is the pattern of apparent motion of objects, surfaces, and edges in a visual scene caused by the relative motion between an observer (an eye or a camera) and the scene or features displayed therein. Sequences of ordered objects within the EVS image allow the estimation of motion as either instantaneous image velocities or as discrete image displacements across display screen 22. Image flow methods calculate the motion between two image frames which are taken at times $t$ and $t+\delta t$ at every position. Some of these methods are differential methods since they are based on local Taylor series approximations of the image signal; that is, they use partial derivatives with respect to the spatial and temporal coordinates. Some exemplary, non-limiting techniques for determining EVS image flow include:

Fast Fourier Transform;

Hough Transform—a feature extraction technique that finds imperfect instances of objects within a certain class of shapes by a voting procedure. This voting procedure is carried out in a parameter space from which object candidates are obtained as local maxima in an accumulator space that is explicitly constructed for computing the Hough transform;

Phase correlation—inverse of normalized cross-power spectrum;

Block-based methods—minimizing sum of squared position differences or sum of absolute position differences, or maximizing normalized cross-correlation, Differential methods based on partial derivatives of the image signal and/or the flow field and higher-order partial derivatives, such methods may include:

Lucas-Kanade Optical Flow Method—regarding image patches and an affine model for the flow field, Horn-Schunck method—optimizing a function based on residuals from a brightness constancy constraint, and a particular regularization term expressing the expected smoothness of the flow field, Buxton-Buxton method—a model of the motion of edges in image sequences, Black-Jepson method—coarse optical flow via correlation, and General variational methods—a range of modifications/extensions of the Horn-Schunck method using other data terms and other smoothness terms; and Discrete optimization methods—where the search space is quantized, and then image matching is addressed through label assignment at every pixel, such that the corresponding deformation minimizes the distance between the source and the target image.

Pyramid feature extraction—where image features are extracted and analyzed at different levels with devices and computer boards available from Sarnoff Corporation of Princeton, N.J.

The image weighting decisioner 18 is also suitably configured to compute the SVS image moving velocity based on the current aircraft avionics and the SVS display scene data. As opposed to the estimated image flow velocity of the EVS image, the actual SVS image moving velocity can be computed to certitude because the required calculations are based on the same stored data that is generating the SVS image. In essence, one can determine the position of every SVS display feature on the image at any moment based on the current aircraft position, attitude, heading, altitude, and geographic location of the feature stored in the SVS database. Having read the disclosure herein, methods for calculating the SVS display moving velocity are known. For the sake of clarity and brevity any discussion thereof will be omitted.

The image weighting decisioner 18 is also configured to compare the SVS image moving velocity of the various topographical features of the SVS image to the EVS image flow velocity of the same features of the EVS image. When the SVS image moving velocity can be determined to match the estimated EVS image flow velocity to within a predefined tolerance, then the EVS image may be deemed reliable based on the correlation level between the EVS image with the SVS image and rendered at its full intensity level. The term "intensity" as used herein is intended to be antonymous with "image transparency." Thus when the EVS image transparency is high, the EVS overlay image becomes barely visible then appears to have intensity.

In some embodiments because of pixel resolution limits of EVS images, the presence of noise (both electronic as well as optical), and limited SVS database resolutions, exact matching of EVS and SVS features may not be achieved. A certain tolerance or threshold may be selected to determine the matching. For example, if a square shaped feature has a mismatch in total area that is less than 10% under certain conditions, the 10% mismatch can be considered identical or "matched." Further, the SVS image may be turned off either automatically or a notice may be generated to alert the pilot that the SVS image may be turned off manually.

The matching analysis may be accomplished using any suitable algorithm or technique. Non-limiting examples of matching analysis may include comparing the rate of change in an aspect of a particular visual feature(s), comparing the change in size of a displayed feature and/or the timing of an appearance or disappearance of a displayed feature from the display device.

When the SVS image moving velocity cannot be determined to match the estimated EVS image flow velocity to within a predefined tolerance, then the EVS image may be presented at a low intensity level so that it appears transparent such that the SVS image may be easily observed through the EVS image. As the estimated EVS image flow velocity approaches or retreats from the predefined tolerance level, the EVS image laid over or along side the SVS image will increase or decrease in intensity (i.e., fade in or out). The change in intensity of the EVS image may be accomplished by utilizing a weighting scheme such that the EVS image may be accorded a near zero weighting when the image flow velocity cannot be determined (e.g., obscured by weather) and the EVS image may be accorded a high (e.g. 100%) weighting when it matches the SVS moving velocity within the predefined tolerance.

In equivalent embodiments, the EVS image may be faded in as the SVS image is faded out. As such, both the EVS image and the SVS image may both be appropriately weighted.

Figure 2:
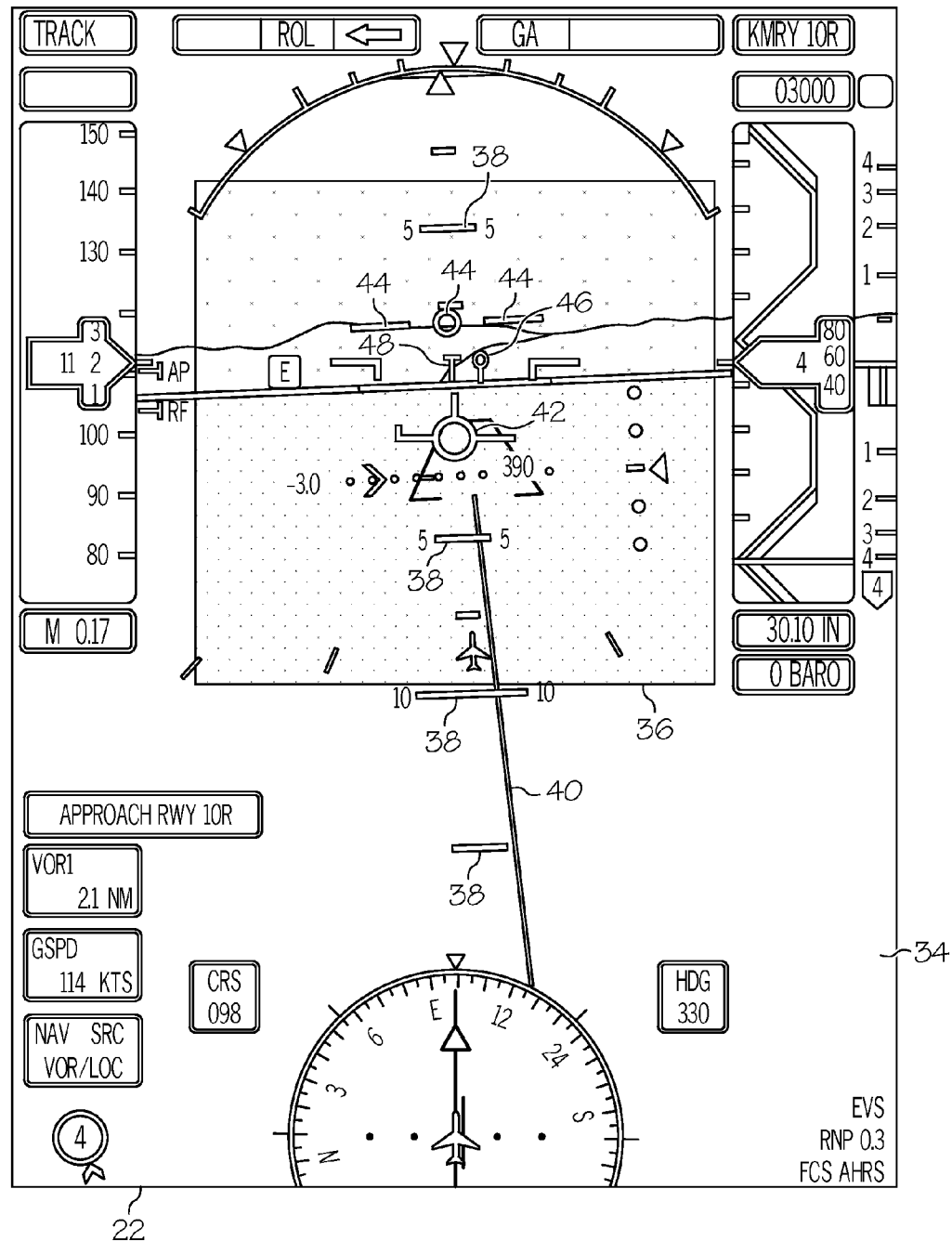
FIG. 2 is a representation of a display screen illustrating an overlaid EVS image with a low intensity level using the system of FIG. 1.

FIG. 2 is a representation of the display screen 22 illustrating an SVS image overlaid by an EVS image when the weighting of the EVS image is zero. As such, the EVS terrain image below the horizon is not perceptible. The images displayed on display screen 22 include an SVS image 34, an EVS image 36 at a minimum predefined intensity level, and multiple dynamic condition images including a pitch ladder 38, a ground track or approach course line 40 going into approach runway position, a flight path marker 42, a flight director 44, a heading indicator 46, and a track indicator 48. Pitch ladder 38 comprises a series of short horizontal lines bordered on opposite sides by number that is indicative of the aircraft's pitch angle. The pitch ladder 38 extends vertically across a majority of display screen 22 and is overlaid on top of EVS image 36. Approach course line 40 is a relatively thin solid line that provides a pilot with a visual indication of the aircraft's ground track. A portion of approach course line 40 is overlaid on top of EVS image 36. Flight path marker 42 is a symbol that represents where the aircraft is currently moving to. It comprises a circular portion and three lines extending therefrom representing the wings and tail fin of an aircraft. Flight path marker 42 provides a pilot with a visual indication of where the aircraft is actually headed with respect to SVS image 34 and EVS image 36. As illustrated, flight path marker 42 is overlaid onto EVS image 36. Flight director 44 is similar to flight path marker 42 and includes a circular portion and two short line segments, one each on opposite sides of the circular portion. Flight director 44 provides a visual representation to the pilot of flight control system command for aircraft attitude adjustment. As illustrated, flight director 44 is overlaid onto EVS image 36. Heading indicator 46 and track indicator 48 provide a pilot with a visual indication of the current heading of the aircraft and the current track that the aircraft is following (e.g., the track will differ from the heading because of environmental factors such as, but not limited to, wind). Heading indicator 46 and track indicator 48 are overlaid onto EVS image 36.

Figure 3:
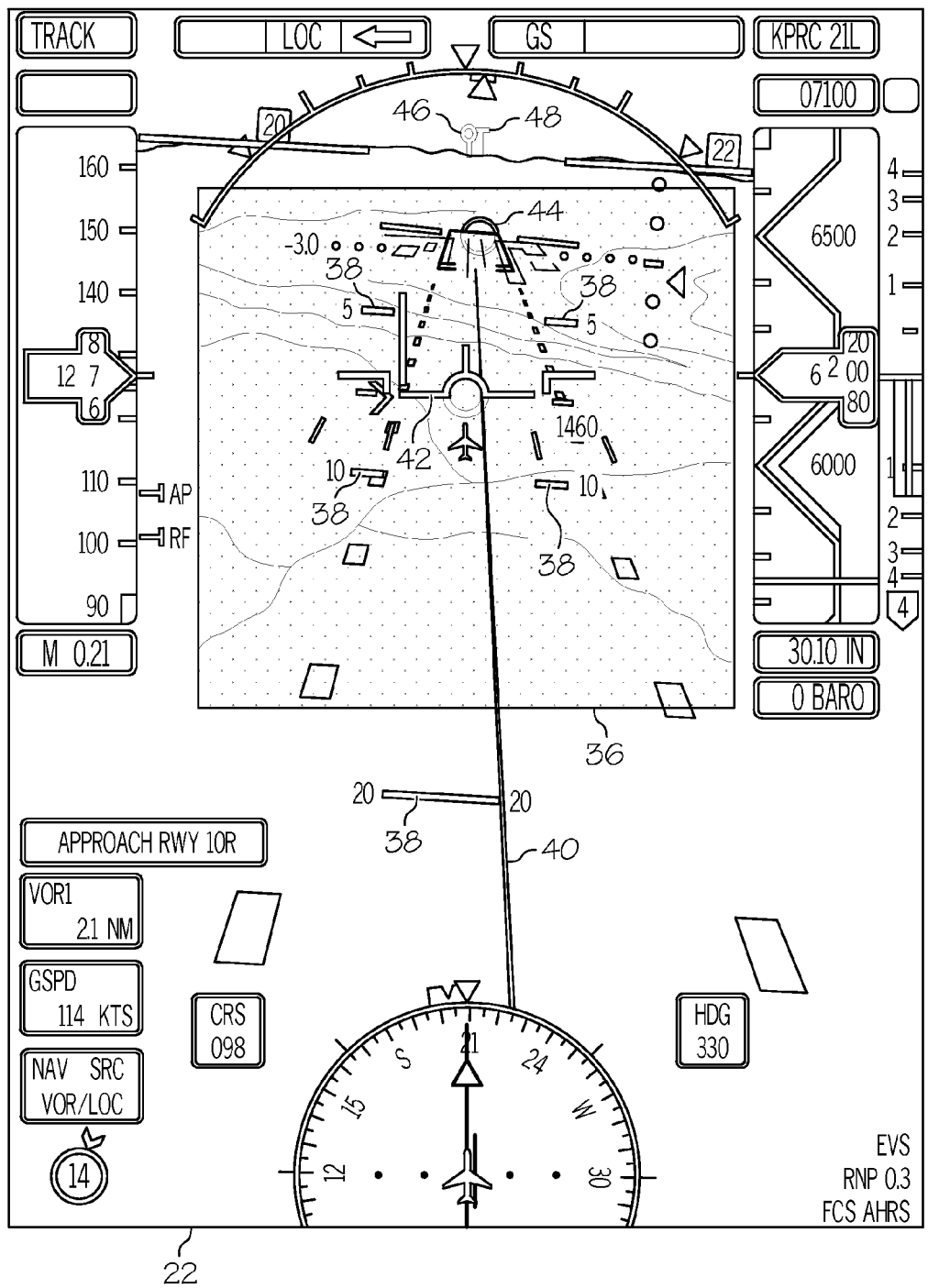
FIG. 3 is a representation of the display screen of FIG. 2 after a comparison of the EVS image and the SVS image signals with the EVS image at a high intensity level.

FIG. 3 is a representation of the display screen 22 of FIG. 2 illustrating the same SVS image 34 now overlaid by the terrain of the EVS image 36 at a maximum predefined intensity level. The maximum intensity level makes the terrain features of the EVS image 36 appear concrete (i.e. substantial, tangible or solid). At this point, the pilot has assurance that the EVS image 36 accurately portrays the same view as the SVS image 34.

Figure 4:
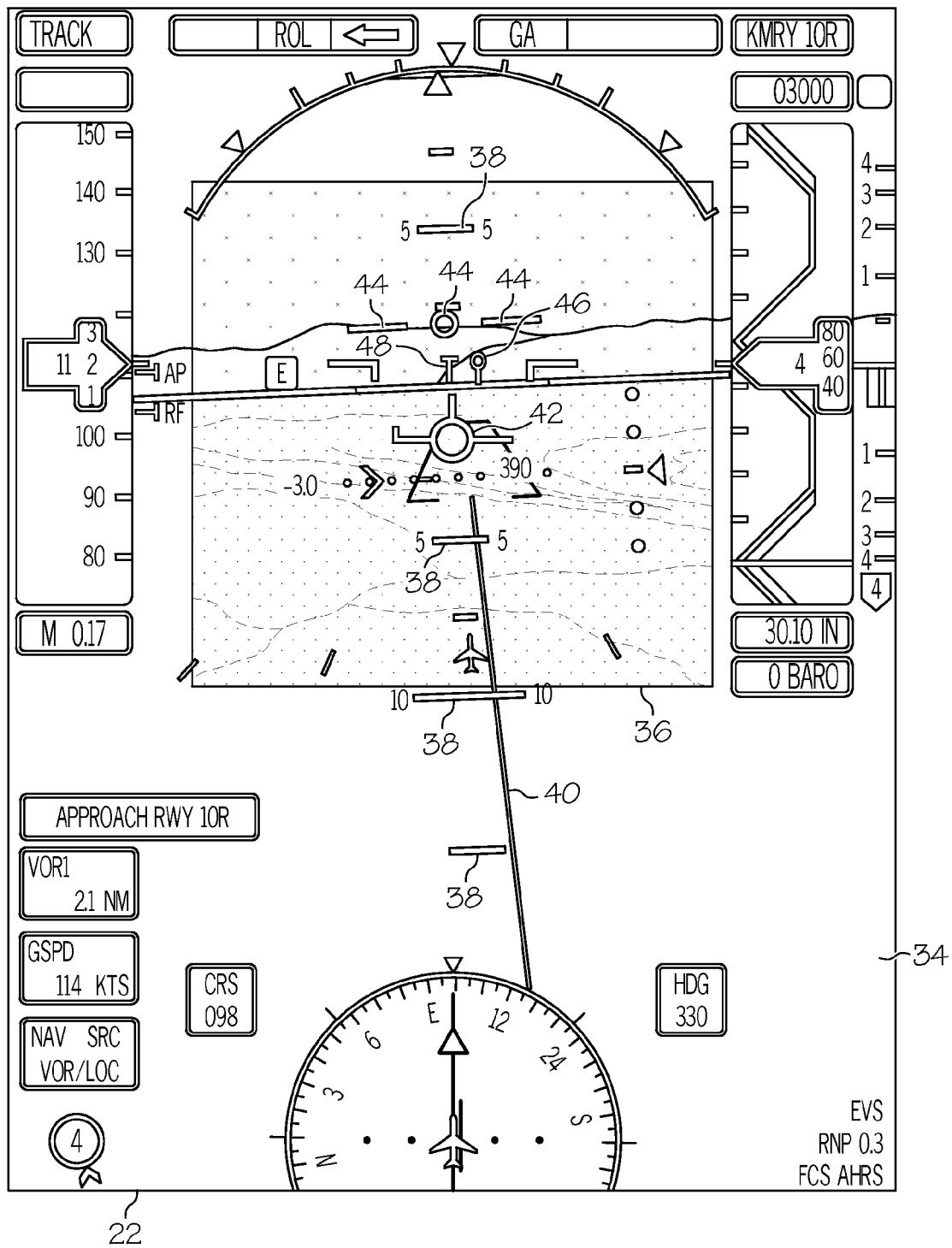
FIG. 4 is a representation of the display screen of FIG. 2 after a comparison of the EVS image and the SVS image signals with the EVS image at a high intensity level.

FIG. 4 is a representation of the display screen 22 illustrating the same SVS image 34 now overlaid by the EVS image 36 with a weighting that is less than 100% but more that zero. At this point, the pilot may or may not have assurance that the EVS image 36 accurately portrays the same view as the SVS image 34. The pilot may use his discretion combined with other indicia available to him as to whether or not to rely upon the EVS image 36 as opposed to the SVS image 34.

Figure 5:
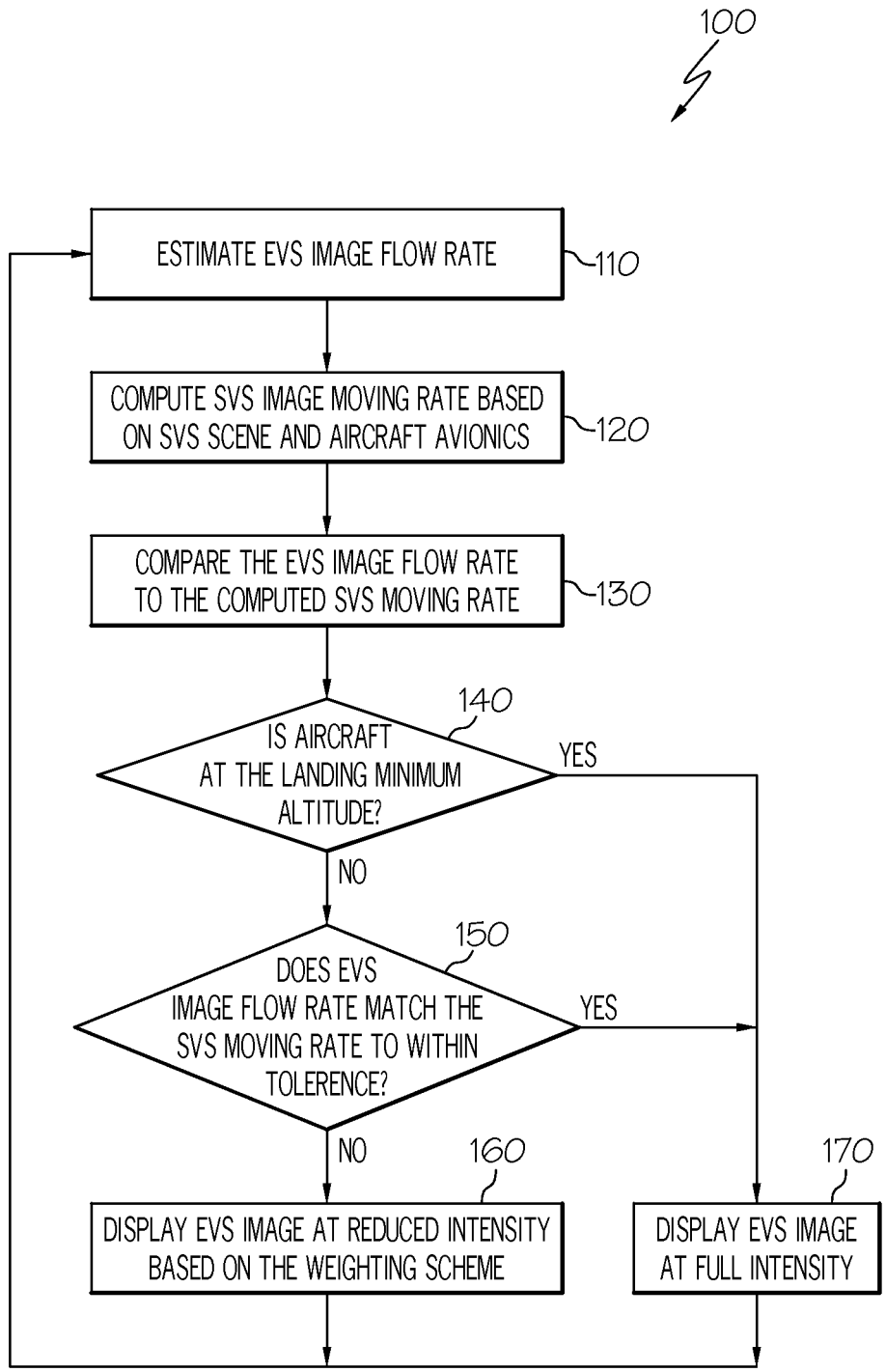
FIG. 5 is a flow diagram illustrating a method for displaying an overlaid EVS image to a pilot of an aircraft during flight.

FIG. 5 is a flow diagram of an exemplary method 100 for controlling the EVS image 36. The method 100 begins at process 110 with the image weighting decisioner 18 estimating the EFS image flow velocity being observed by the EVS 12. At process 120, the image weighting decisioner 18 then computes the SVS image moving velocity for the SVS image based on the aircraft's position and avionics.

At process 130, the image weighting decisioner 18 compares the EVS image flow velocity to the SVS moving velocity. The image weighting decisioner 18 then determines whether the aircraft has descended below the landing minimum altitude (e.g., 200 feet) at decision point 140. If so, the method 100 proceeds to process 170 where the EVS image is displayed at its maximum predefined intensity. This is so because current flight regulations do not permit an SVS system to be used at such low altitudes due to potential discrepancies caused by stale or otherwise inaccurate databases. In some embodiments, the EVS system may be configured to turn itself on at the landing minimum altitude and in others the pilot may receive an indication or warning to turn on the EVS system manually.

When the aircraft has not descended below the landing minimum altitude, then the pilot has discretion to use either the EVS image or the SVS image or both. At decision point 150, the image weighting decisioner 18 determines if the EVS image flow velocity matches the SVS image moving velocity to within the predetermined tolerance. If so, the process proceeds to process 170 as discussed above.

When the EVS image flow velocity does not match the SVS image moving velocity to within a predetermined tolerance, then the image weighting decisioner 18 calculates and applies a weighting to the display intensity based upon the difference between the EVS image flow velocity and the SVS moving velocity. The weighting may range between a predetermine minimum (e.g. zero) and a predetermined maximum (e.g. 100).

For example, if the aircraft finds itself in a low visibility environment where the EVS 12 cannot detect any terrain features, then the image weighting decisioner 18 determines that the EVS image velocity and the SVS image moving velocity do not match at all and thus may assign a zero weighting to the EVS image intensity. As such, the EVS image may be barely visible over the SVS image on the display screen 22, and pilot can primarily use the SVS image.

However, as the aircraft clears the low visibility environment, the EVS 12 may more clearly detect terrain and navigation objects. However, the predetermined tolerance level may still not be reached. As such the image weighting decisioner 18 may assign an intermediate weighting (e.g., 50%) to the EVS image intensity. As such, the EVS image intensity would become move visible as being overlaid upon the SVS image.

By fading in the EVS image as the EVS system begins to match its view to that of the SVS system, the pilot receives a growing assurance that the EVS system is in fact displaying the expected terrain as he approaches the airfield. Thus, at process 160 the EVS image is displayed at an intermediate intensity based on the closeness of the match between the image flow velocity of the EVS system and the moving velocity of the SVS system. The method then returns to process 110 to begin another iteration to modify the intensity of the EVS image. Upon an approach to an airfield the iterative modification is usually an increase in intensity.

Hence, in flight conditions with obscured visibility, the intensity of the overlaid EVS image will be low, thereby indicating to the pilot that the EVS system does not yet observe the same scene as the SVS system with a high degree of assurance. As the EVS system begins to detect terrain features and lights, the reliability of the EVS system increases, thereby increasing the intensity of the EVS overlay. Thus the pilot acquires assurance that the EVS system is displaying an accurate view before he relies upon it.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A system for displaying a first image and a second image to a pilot of an aircraft during flight, the system comprising:
 a dynamic condition subsystem configured to detect a dynamic condition of the aircraft and to generate a first signal indicative of the dynamic condition of the aircraft;
 a sensor subsystem configured to detect a light transmission originating from an exterior of the aircraft and to generate a second signal indicative of the light transmission;
 a display unit having a display screen; and
 a computing device communicatively coupled to the sensor subsystem and to the dynamic condition subsystem and operatively coupled to the display unit, the processor configured to:
  obtain the first signal and the second signal,
  command the display unit to display the first image on the display screen corresponding to the first signal,
  compute an image moving velocity of the first image;
  estimate an image flow velocity for the second image based on the second signal;
  compare the moving velocity of the first image to the image flow velocity of the second image;
  command the display unit to display the second image overlaid on the first image; and
  command the display unit to establish the intensity of the second image within a predefined range based upon the comparison.

2. The system of claim 1, wherein the sensor subsystem comprises an enhanced vision system.

3. The system of claim 1, wherein the dynamic condition subsystem comprises a synthetic vision system.

4. The system of claim 1, wherein the computing device is configured to iteratively modify the intensity of the second image as the aircraft approaches a runway.

5. The system of claim 1, wherein the computing device is configured to obtain a third signal comprising an altitude.

6. The system of claim 5, wherein the computing device is configured to command the display unit to display the second image at pre-determined maximum intensity when the third signal indicates an altitude near or below a landing minimum altitude.

7. The system of claim 1, further comprising command the display unit to establish the intensity of the second image at a pre-defined maximum intensity when the moving velocity of the first image matches the image flow velocity of the second image to within a predefined tolerance.

8. The system of claim 1, wherein the computing device commands the display unit to establish the intensity of the second image within a predefined range based upon the comparison by assigning a weighting factor that is applied to the intensity level of the second image.

9. The system of claim 1, wherein the computing device is configured to permit a pilot to manually command maximum intensity of the second image.

10. A method for displaying a first image a second image to a pilot of an aircraft during flight, the method comprising:
   obtain a first image signal and a second image signal,
   commanding a display unit to display a first image on a display screen correspond to the first signal,
   compute an image moving velocity of the first image;
   estimate an image flow velocity for the second image based on the second image signal;
   compare the image moving velocity of the first image to the image flow velocity of the second image; and
   command the display unit to display the second image overlaid on the first image with an intensity of the second image being within a predefined range based upon the comparison.

11. The method of claim 10, wherein the first image signal is a synthetic vision system image signal.

12. The method of claim 11, wherein the second image signal is an enhanced vision system signal.

13. The method of claim 10, further comprising iteratively modifying the intensity of the second image as the aircraft makes an approach to a runway.

14. The method of claim 10, further comprising:
   determining the altitude of the aircraft; and
   when the altitude of the aircraft is below a landing minimum altitude, commanding the display unit to display the second image at a maximum predefined intensity.

15. The method of claim 14, further comprising:
   when the altitude of the aircraft is above the landing minimum altitude, commanding the display unit to display the second image at a weighed intensity between the maximum predefined intensity and a minimum predefined intensity.

16. The system of claim 15, wherein the weighted intensity is determined by a weighting decisioner based on a correlation level between the first image and the second image.

17. A computer readable storage medium including instructions recorded thereon that when executed perform the acts of:
   obtaining a first image signal and a second image signal,
   commanding a display unit to display a first image on a display screen corresponding to the first signal,
   computing an image moving velocity of the first image;
   estimating an image flow velocity for the second image based on the second image signal;
   comparing the image moving velocity of the first image to the image flow velocity of the second image; and
   commanding the display unit to display the second image overlaid on the first image and to establish an intensity for the second image.

* * * * *